United States Patent [19]

Freeburg et al.

[11] Patent Number: 5,355,520
[45] Date of Patent: Oct. 11, 1994

[54] IN-BUILDING MICROWAVE COMMUNICATION SYSTEM PERMITS FREQUENCY REFUSE WITH EXTERNAL POINT-TO-POINT MICROWAVE SYSTEMS

[75] Inventors: Thomas A. Freeburg, Arlington Heights; Charles L. Warren, West Chicago, both of Ill.

[73] Assignee: Motorola, Inc., Schaumburg, Ill.

[21] Appl. No.: 621,673

[22] Filed: Nov. 30, 1990

[51] Int. Cl.$^5$ ............................................. H04B 7/00
[52] U.S. Cl. ........................ 455/53.1; 455/63; 455/277.1; 455/301; 343/841
[58] Field of Search ............ 455/63, 65, 41, 272, 455/296, 300, 301, 277, 277.1, 277.2, 53.1; 343/841, 853, 893

[56] References Cited

U.S. PATENT DOCUMENTS

| | | | |
|---|---|---|---|
| 3,872,387 | 3/1975 | Banach | 455/233 |
| 4,153,878 | 5/1979 | Osborn | 455/272 |
| 4,408,348 | 10/1983 | Theriault | 455/180 |
| 4,476,583 | 10/1984 | Mutekspaugh | 455/180 |
| 4,499,602 | 2/1985 | Hermeling, Jr. et al. | 455/180 |
| 4,581,643 | 4/1986 | Carlson | 455/314 |
| 4,668,958 | 5/1987 | Keiser | 343/841 |
| 4,777,488 | 10/1988 | Carlman, Jr. et al. | 455/73 |
| 4,843,639 | 8/1989 | Hendricks et al. | 455/182 |
| 4,941,207 | 7/1990 | Maeda et al. | 455/41 |
| 5,012,235 | 4/1991 | Andros et al. | 453/182 |
| 5,048,057 | 9/1991 | Saleh et al. | 453/60 |
| 5,117,236 | 5/1992 | Chang et al. | 455/133 |

OTHER PUBLICATIONS

High Performance Receiver, Ash, Darrell L., IEEE Transactions on Consumer Electronics, vol. CE-24, No. 1, Feb. 1978.

*Primary Examiner*—Reinhard J. Eisenzopf
*Assistant Examiner*—Edward Urban
*Attorney, Agent, or Firm*—Val Jean F. Hillman

[57] ABSTRACT

A wireless in-building RF communications system operates within a building in a microwave frequency range which is also utilized by a point-to-point microwave communication system such that frequency reuse is provided. Central modules and user modules each consist of RF transceivers and antenna systems. The wireless communication system includes a mechanism for limiting magnitude of RF signals transmitted by it from exceeding a predetermined level sufficiently small to prevent interference with the point-to-point communications system.

15 Claims, 2 Drawing Sheets

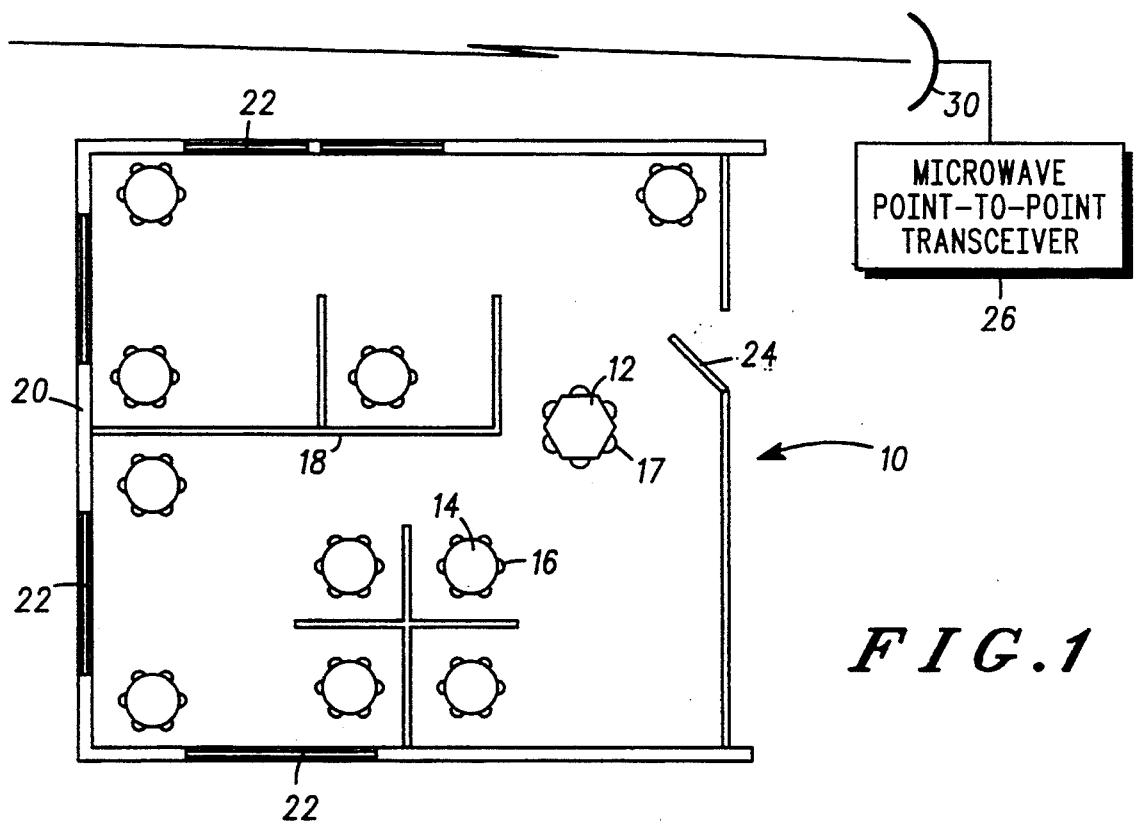
*FIG.1*
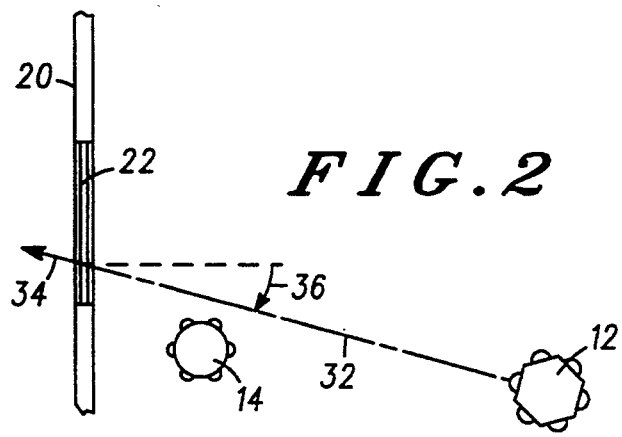
*FIG.2*
*FIG.3*
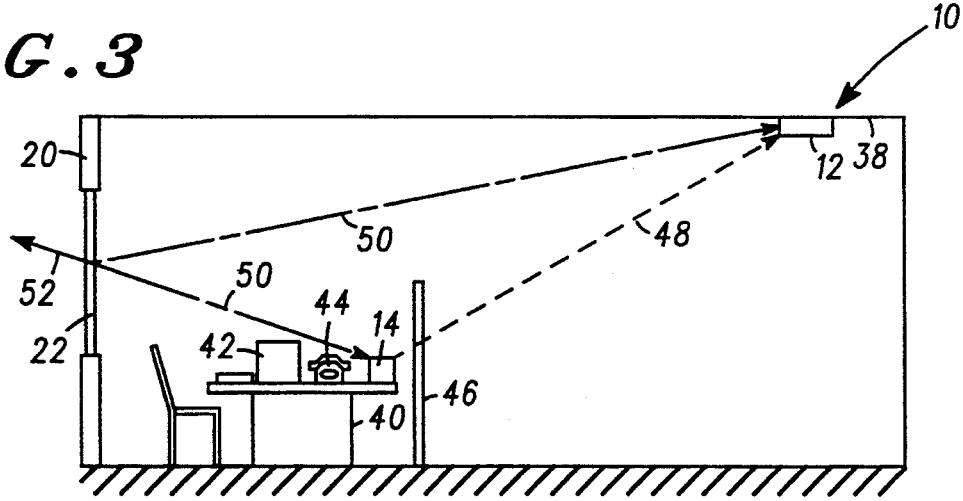

IN-BUILDING MICROWAVE COMMUNICATION SYSTEM PERMITS FREQUENCY REFUSE WITH EXTERNAL POINT-TO-POINT MICROWAVE SYSTEMS

BACKGROUND OF THE INVENTION

This invention is generally directed to a radio frequency (RF) local area network (LAN) which operates within a building and facilitates the sharing of the same frequencies utilized by existing microwave point-to-point systems.

The worldwide availability of additional frequencies for expanding communication demands is limited. The choice of frequency spectrum is further limited due to substantially different propagation characteristics at different frequencies. Therefore, different communication systems which need the same propagation characteristics all contend for desirable frequencies. This creates a need to share scarce RF channels wherever possible.

It is believed that the microwave frequency range of 2–20 gigahertz (GHz) represents a good choice for an in-building RF LAN. This choice is shaped by several factors. For such a system to be commercially viable, it must be reasonably cost effective. The ability to manufacture transmitters and receivers which can be sold at reasonable consumer prices suggests the range not exceed 20 GHz. At frequencies lower than about 2 GHz the size of components utilized in the RF portion of the system begin to increase in size such that the finished unit starts to become large. Also as the frequency decreases, the propagation characteristics becomes unfavorable for in-building communications where frequency reuse is desired since too great a communication range may occur. Another reason this choice of frequencies is desirable for such systems is that substantial contiguous bandwidths are available to support needed communication throughput.

The possibility of interference to an existing microwave point-to-point communications system by such an in-building RF LAN presents an important consideration. The present invention addresses this concern.

BRIEF DESCRIPTION OF THE DRAWINGS

FIG. 1 illustrates a partial top view of a floor of a building having an RF LAN system in accordance with the present invention that is located in the vicinity of a microwave point-to-point communication system.

FIG. 2 illustrates a control module of the RF LAN system located in a building relate to an outside window.

FIG. 3 is a elevational view of an area inside a building illustrating a propagation path between a user module and a control module.

DESCRIPTION OF A PREFERRED EMBODIMENT

Figure 4:
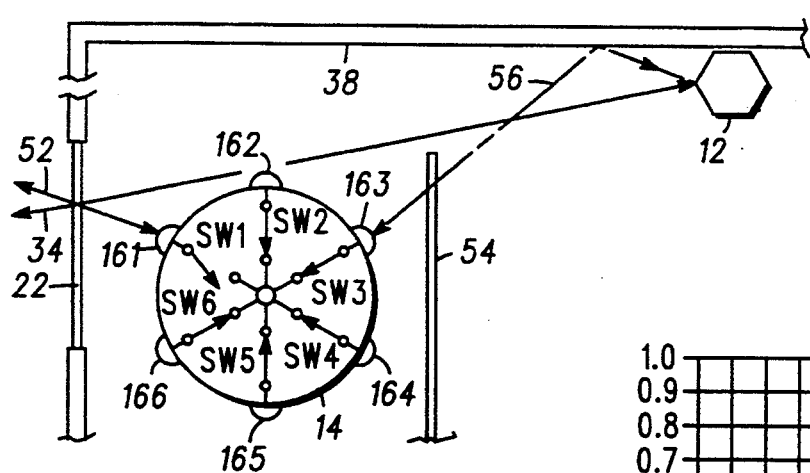
FIG. 4 illustrates a user module in which certain of its antennas can be inactivated to prevent selection of an antenna which would produce undesired external radiation levels.

FIG. 1 illustrates a partial top view of a building 10 with an RF LAN system consisting of a control module 12 and a plurality of user modules 14 in accordance with the present invention. The control module 12 acts as a node which is capable of communication with each of the user modules 14. The control module and each of the user modules consist of a microwave RF transceiver capable of communications with each other. Each user module contains a plurality of directional antennas 16 and in the illustrative embodiment consists of six unidirectional antennas with approximately 60° of horizontal plane coverage thereby providing 360° of horizontal coverage. It is preferred that the control module 12 also contain the same antenna arrangement 17 permitting the best antenna at the control module and the best antenna at the user module to be selected for communications between same. In the illustrative embodiment the same frequency within the range of 2–20 GHz, with a frequency of approximately 18 GHz being preferred, is utilized for information transmitted from the user module to the control module and from the control module to the user module.

The building 10 includes a plurality of interior walls 18, exterior walls 20, exterior windows 22, and an interior door 24. The illustrated building is representative of a relatively modern office building in which each of the user modules serves a person or a device with which communications is required. The external windows 22 represent openings or ports through which a microwave RF signal transmitted inside the building can escape without substantial attenuation. The control of undesired radiation of RF signals generated within the building is of key importance in permitting an RF LAN system in accordance with the present invention to be utilized concurrently with other communication systems operating at the same frequencies.

A microwave point-to-point transceiver 26 utilizes the same frequencies as the RF LAN system in building 10 and transmits its signals 28 by unidirectional antenna 30 which typically consists of a parabolic dish antenna having a narrow beamwidth.

Figure 6:
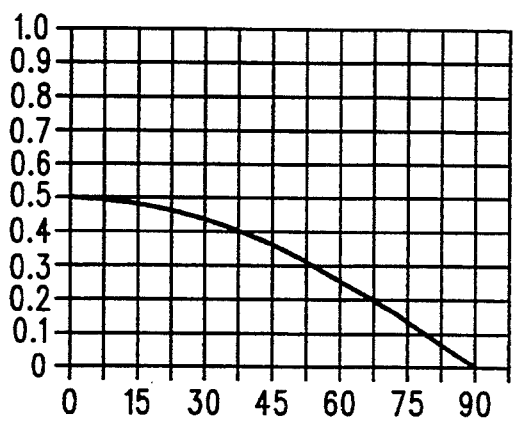
FIG. 6 is a graph of the transmission characteristic of a typical window glass reduce heat transmission versus the incident angle of RF energy.

FIG. 2 illustrates a control module 12 transmitting a signal 32 directed towards window 22. The signal 32 is intended for a user module situated generally in the the direction of signal path 32 somewhere between the control module and the window. That portion of signal 32 which is transmitted through window 22 escapes the building and is identified as signal 34. The magnitude of signal 34 which escapes the building depends on the distance between the window and the control module 12, the angle 36, i.e. the angle formed by the center lobe of signal 32 perpendicular to the plane of window 22, and the effective radiated power of the signal as transmitted. A signal transmitted normal to window 22 would have an angle of 0° and a signal transmitted substantially parallel to the plane of window 22 would have an angle of approximately 90°. FIG. 6 is a graph illustrating the transmittance of a single pane window 22 relative to angle 36.

Figure 7:
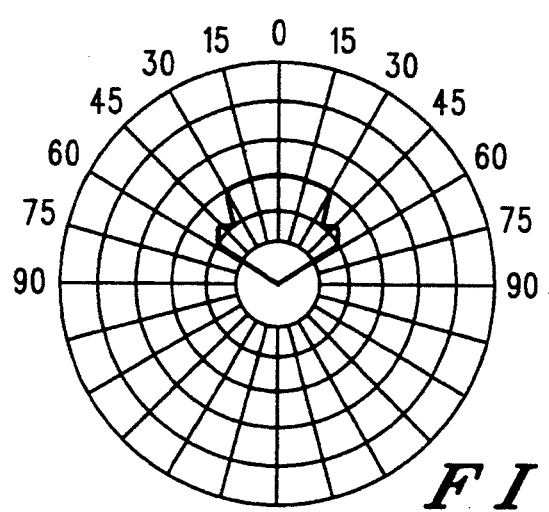
FIG. 7 illustrates a user module antenna pattern in the horizontal plane.
Figure 8:
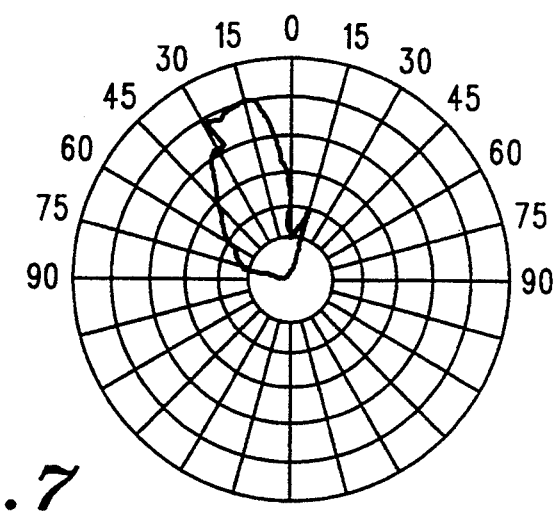
FIG. 8 is a user module antenna pattern in the vertical plane.

FIGS. 7 and 8 illustrate antenna patterns for a preferred embodiment of antennas utilized in accordance with the present invention. The horizontal characteristics of the unidirectional antenna is shown by FIG. 7. FIG. 8 illustrates the vertical pattern for the antenna in which 0 represents the horizontal plane and 90 the vertical plane. As seen, the main pattern is directed within a 60° horizontal plane with the maximum transmission in the vertical plane occurring at approximately 15° above the horizontal plane. The user module is typically placed on a desk or other fixture in the room. The same type of antenna and patterns are utilized for the control module except that the antenna is rotated 180° with the control module preferably being mounted to the ceiling of the office building so that the primary beam points down from the ceiling in the office area.

FIG. 3 illustrates typically locations within office building 10 of a control module 12 and a user module 14. The control module is mounted to the ceiling 38 of the office area. The user module 14 is located on the top of a desk 40 which also supports a personal computer 42 and a telephone 44. The user module is connected to the computer and telephone to provide wireless communications to other computers and telephones. In the preferred microwave frequency range, signals can effectively penetrate conventional walls made of drywall material and other non-metal materials. In the illustrative situation shown in FIG. 3, a partition (wall) 46 consists of sheet metal and impairs the direct signal path 48 between the user module and control module such that the direct signal path is not usable. The user module and the control module each are capable of selecting the most appropriate antenna to facilitate communications between a particular control module and user module. Various antenna selection techniques exist for selecting a particular antenna based on various parameters.

Because of interfering wall 46, assume that a signal path 50 between the control module and user module is selected. As illustrated this signal path includes an intermediate reflection on window 22. Considering the condition in which the user module 14 is transmitting to the control module 12, part of the signal along path 50 is reflected at window 22 and part is transmitted as signal 52 outside of the building. As previously discussed with regard to FIG. 6, the attenuation provided by the window is a function of the incident angle of path 50 to the window. In FIG. 3 the distance between the user module 14 and window 22 is substantially closer than the distance between the control module 12 and the window 22. Thus, for the same effective radiated power (ERP) and angle of incidence, the escaping signal 52 generated by the user module will be larger than the escaping signal 34 generated by the control module. It will be apparent to those skilled in the art that escaping signal 52 thereby presents the greatest possibility for interference for an external RF system, such as microwave transceiver 26, utilizing the same frequency.

The following example identifies the parameters which must be maintained in order for the RF LAN system in accordance with the present invention to reuse frequencies used in a point-to-point microwave system. For an RF LAN system to coexist with a point-to-point microwave system, the RF LAN signal at the point-to-point receiver must be below the level of the signal from the corresponding point-to-point transmitter by at least the capture ratio of the point-to-point system. The required capture ratio normally falls within the range of 17–24 dB. Taking the worse case number (24 dB) and adding a 3 dB path tolerance results in:

$$Pr = 27 \text{ dB} \quad (1)$$

where Pr equals protection required at point-to-point receiver. The free space path loss Lf between isotropic antennas at 18 GHz is:

$$Lf = 117.8 + 20 \log (Dkm) \quad (2)$$

where Dkm is the distance between antennas in kilometers. For a 20 km path between point-to-point antennas the path loss is:

$$Lf \sim 144 \text{ dB} \quad (3)$$

Most point-to-point transmitters in the 18 GHz band utilize a transmitter power of about 50 mW. Using a typical 40 dBi gain antenna, the resulting effective radiated power is 57 dBm. The received signal Sr at the point-to-point receiver is:

$$Sr = 57 \text{dBm} - 144 \text{dB} = -87 \text{dBm} \quad (4)$$

The above received signal Sr ignores the antenna gain at the receive antenna since the gain will be the same for the desired and undesired signal.

The maximum allowed RF LAN signal Sw at the point-to-point receiver antenna is:

$$Sw = Sr - Pr = -87 - 27 \text{dBm} = -114 \text{dBm} \quad (5)$$

The EIRP of the RF LAN transmitter at the point of maximum antenna gain is 25 dBm. The preferred embodiment antenna of the RF LAN system has a gain in the horizontal plane which is 10 dB lower than the peak power; thus the available interfering power is 15 dBm. The path loss Lw required between the RF LAN transmitter and the point-to-point receiver antenna is:

$$Lw = 114 \text{dB} + 15 \text{dB} = 129 \text{dB} \quad (6)$$

The outside building wall provides a transmission loss or attenuation of at least 25 dB at 18 GHz. However, the worse case situation arises where an RF LAN antenna points directly out a window. A thermo pane window provides approximately 6 dB of loss. Thus, the remaining loss Lr which must be acquired with physical separation and antenna directionality is:

$$Lr = 129 \text{dB} - 6 \text{dB} = 124 \text{dB} \quad (7)$$

The consideration of the directionality of the point-to-point receiving antenna presents two significant cases: off-beam location and on-beam location. In the off-beam case, the sidelobe level of 30 dB of the point-to-point receiver antenna is anticipated. Thus the remaining loss Lp is:

$$Lp = 124 - 30 \text{dB} = 94 \text{dB} \quad (8)$$

The required separation distance for the off-beam case is determined from equation (2) where:

$$94 = 117.8 + 20 \log (Dp) \quad (9)$$

resulting in a minimum distance of 65 meters.

For the on-beam case, the required distance also found from equation (2) is:

$$124 = 117.8 + 20 \log (Dr) \quad (10)$$

resulting in a required separation distance of 2040 meters. Typical directional antennas used for the point-to-point service exhibit a 10 dB beamwidth of 1.2 degrees. At a distance of 2040 meters, this corresponds to a zone width Wz of:

$$Wz = 2 * 2040 \sin (0.6 \text{ degrees}) = 43 \text{ meters} \tag{11}$$

Thus, the RF LAN system should not be placed within 43 meters of the center of the beam of the point-to-point receive antenna if the RF LAN system is within 2040 meters of the antenna. To be within the parameters of the on-beam case is unlikely, as the point-to-point paths are normally designed to be line-of-sight, with no buildings or other obstructions within a 50 meter or greater clearance radius about the center of beam path. Also, point-to-point transmission distances are greater than 2 km so that an RF LAN located in a building at the center of a point-to-point link would not fall within the 2040 meter requirement.

Summarizing, the distance between an exterior window from which the RF LAN signal is radiated and the receive antenna of an external point-to-point microwave receiver, the required separation is as follows. For the off-beam case the required separation is 65 meters. For the on-beam case the required separation is 2040 meters. Generally, the off-beam case can usually be satisfied since it would be rare that a building would be within 65 meters of the point-to-point receiving antenna. While the on-beam case requires a substantial distance separation, it must be remembered that these calculations represent conservative path loss estimates for the external window and maximum radiation angles from the RF LAN antenna, and that point-to-point path design constrains path clearance to much larger numbers than 43 meters.

FIG. 4 illustrates an exemplary arrangement for the RF LAN system in accordance with the present invention in which the radiated external signal 52 transmitted from the user module 14 may exceed desired limits. Since the user modules maybe located relatively close to an external window 22, the magnitude of a resulting external signal 52 should be limited to less than 30%, and preferably less than 10%, of the effective radiated power from the user module. In this example, a metal wall 54 impairs the transmission path 56 between antenna 163 of the user module and the utilized antenna on the control module 12. Because of the loss of signal strength the user module would have normally selected an alternate antenna 161 which would result in the radiation of signal 52. In order to prevent such undesired radiation, user module 14 includes switches Sw1–Sw6 corresponding respectively to each of the six directional antennas 161–166. Each of the six antennas can be disabled by opening the respective switch. In the illustrative situation, antenna 161 is disabled by opening switch Sw1. This leaves the user module with five other antenna choices for communications with the control module 12. In the illustrative embodiment antenna 163 may be selected as the best path since wall 54 does not totally block the 60° beam from antenna 163. Thus, the switches provide a means for inhibiting certain antennas thereby minimizing outside radiation levels that would have been caused by the use of such antennas.

Figure 5:
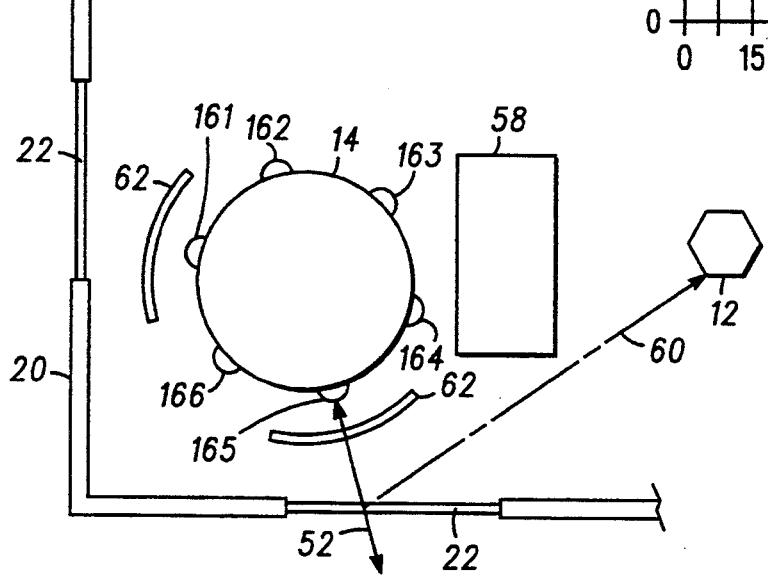
FIG. 5 illustrates a user module in relation to exterior windows in which antennas which would point towards external windows are shielded to prevent undesired external radiation levels.

FIG. 5 illustrates another example of an RF LAN system in which the potential for excessive external radiation from windows 22 is possible if antenna 161 or 165 is selected for transmissions from the user module to the control module. An object 58 which provides at least partial attenuation for signals between the user module and control module could induce the user module to select antenna 165 for communications with control module by path 60. The transmission by the user module along path 60 could produce an undesired level of radiation 52. Metal reflectors 62 are shown placed between antennas 161 and 165 and windows 22 in order to prevent use of such antennas from resulting in excessive outside signals 52. It will be apparent to those skilled in the art that these elements 62 which are preferably placed relatively close to the respective antennas may either substantially reflect the RF energy or provide for substantial RF energy absorption. Reflective elements would of course permit the antennas to be utilized by providing a reflective surface for redirecting the path of the RF energy. An RF absorber would substantially absorb energy transmitted from such antennas and thus rely on the antenna selection of the user module to select alternate antennas for use. Dependent upon the environment and other conditions either type of element could be utilized to achieve the desired results of preventing excessive signal levels 52 from occurring.

Although an embodiment of the invention has been described and illustrated in the drawings, the scope of the invention is defined by the claims which follow.

We claim:

1. A wireless radio frequency (RF) communication system disposed in a building having windows, operating on a first frequency which is also available for use by a different communications system located outside of the building, the in-building communications system comprising:

a central module (CM) that includes an RF transmitter, RF receiver and antenna system;

a plurality of user modules (UM) each including an RF transmitter for transmitting signals to said CM receiver, an RF receiver for receiving signals from said CM transmitter, and an antenna system consisting of unidirectional antennas each having a predetermined horizontal pattern beamwidth and being oriented to provide substantially 360° of total horizontal pattern coverage for each UM; and switching means, coupled to the UM antenna system, for limiting the magnitude of RF signals exiting said building to a predetermined level, said predetermined level being below a transmit signal level for the different communication system by at least the capture ratio of the different communication system, to prevent interference to the different communications system located outside of the building.

2. The system according to claim 1 wherein said first frequency is within the range of 2–20 GHz.

3. The system according to claim 2 wherein said antenna system of each UM consists of six unidirectional antennas each having a horizontal beamwidth of substantially 60°.

4. The system according to claim 1 wherein said different communication system comprises a microwave point-to-point communications system utilizing unidirectional antennas for signal transmission and reception.

5. The system according to claim 1 wherein said CM is located at least 7 meters (20 feet) from the nearest external window and further comprising means for preventing signals transmitted by certain antenna of each UM from being directed toward an external window where more than 10 percent of the effective radiated power of the signal would exit the window.

6. The system according to claim 5 wherein said preventing means is disposed between said certain antennas and said windows for intercepting said signals and substantially preventing said signals from reaching the window.

7. The system according to claim 6 wherein said preventing menas is a device selected from the group consisting of:
RF energy reflectors; and
RF energy absorbers.

8. The system according to claim 1 wherein said inhibiting means further comprises means for calculating a path loss between the in-building communications system and the different communications system located outside of the building.

9. A wireless radio frequency (RF) communication system, disposed in a building having external windows and operating on a first frequency within the 2-20 GHz range which is also available for use by a point-to-point microwave communications system located outside of the building, the in-building communications system comprising:
a central module (CM) that includes an RF transmitter, RF receiver and antenna system;
a plurality of user modules (UM) each including an RF transmitter for transmitting signals to said CM receiver, an RF receiver for receiving signals from said CM transmitter, and an antenna system consisting of a plurality of unidirectional antennas each having a predetermined horizontal pattern beamwidth; and
means, coupled to the UM antenna system, for inhibiting certain UM antennae from being utilized, thereby limiting the magnitude of RF signals exiting said building to a predetermined level, said predetermined level being below a transmit signal level for the point-to-point communication system by at least the capture ratio of the point-to-point Communication system, to prevent interference to the point-to-point communications system.

10. The system according to claim 9 wherein said antenna system of each CM and UM consists of six unidirectional antennas each having a horizontal beamwidth of substantially 60°.

11. The system according to claim 9 wherein said CM is located at least 7 meters (20 feet) from the nearest external window and said system further comprising means for preventing signals transmitted by certain antenna of each UM from being directed toward an external window where more than 10 percent of the effective radiated power of the signal would exit the window.

12. The system according to claim 11 wherein said preventing means comprises means disposed between said certain antennas and said windows for intercepting said signals and substantially preventing said signals from reaching the window.

13. The system according to claim 11 wherein said different communication system comprises a microwave point-to-point communications system utilizing unidirectional antennas for signal transmission and reception.

14. The system according to claim 11 wherein said preventing means is a device selected from the group consisting of:
RF energy reflectors; and
RF energy absorbers.

15. The system according to claim 9 wherein said inhibiting means further comprises means for calculating a path loss between the in-building communications system and the point-to-point communications system located outside of the building.

* * * * *